May 27, 1969     K. A. KLENZ     3,446,239
PRESSURE CONTROL VALVE
Filed Jan. 3, 1967
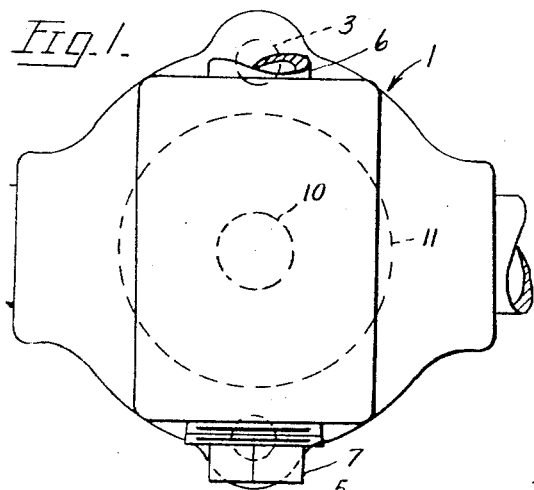
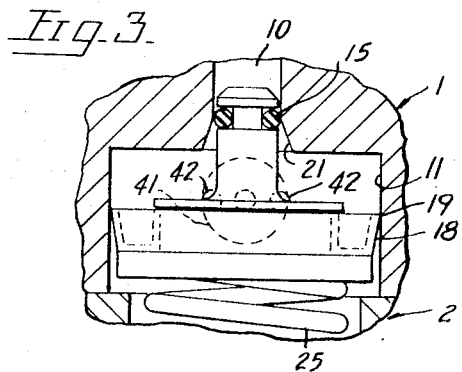
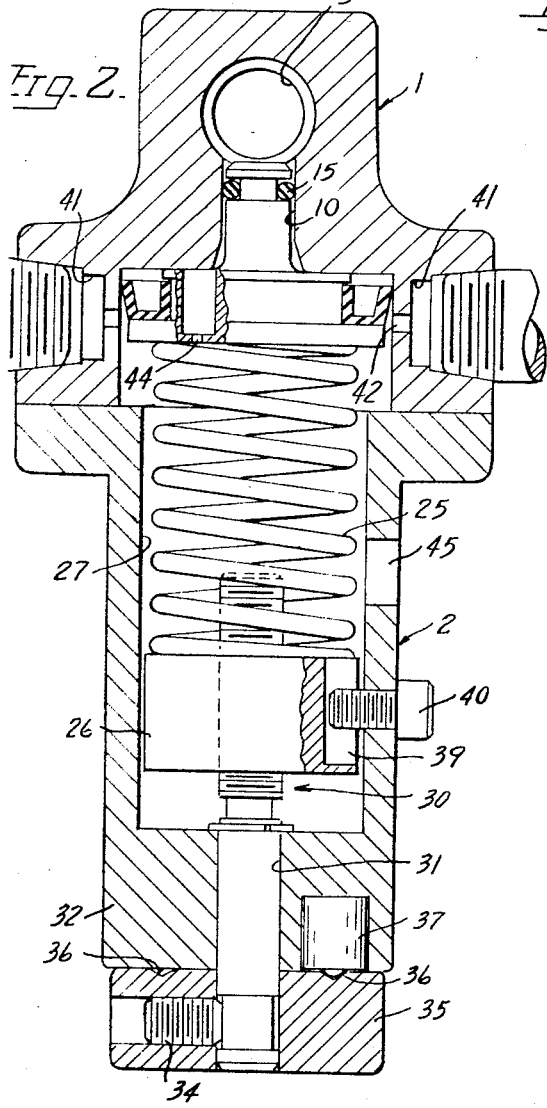
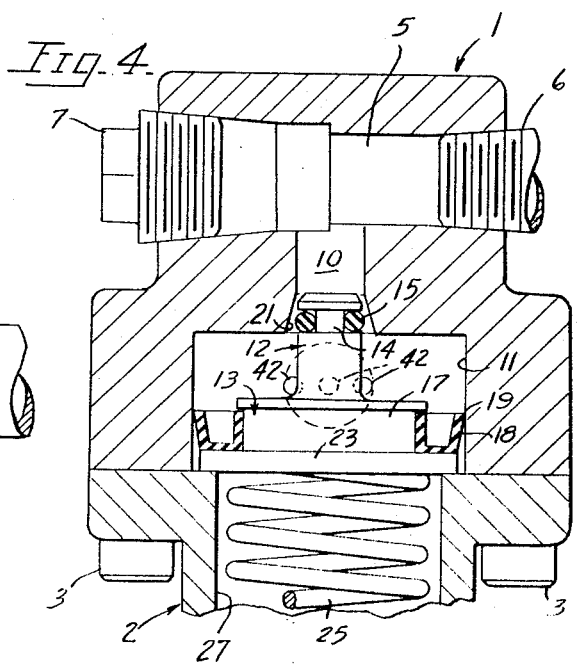
INVENTOR.
KARL A. KLENZ
BY
Gordon Wood.

United States Patent Office 3,446,239
Patented May 27, 1969

3,446,239
PRESSURE CONTROL VALVE
Karl A. Klenz, Oakland, Calif., assignor to Rheem Manufacturing Company, New York, N.Y., a corporation of California
Filed Jan. 3, 1967, Ser. No. 607,032
Int. Cl. F16k *17/30*
U.S. Cl. 137—469                                4 Claims

ABSTRACT OF THE DISCLOSURE

A valve adapted for use in hydraulic and pneumatic circuits which is spring loaded to open at a predetermined adjustable inlet pressure to divert fluid flow to a part of the circuit. The valve structure is designed to provide a fast action when the predetermined pressure is reached.

---

This invention relates to a fluid pressure control valve which is particularly adapted for use in a pneumatic circuit wherein it is desired to sequence various interdependent functions of the circuit.

More particularly the invention relates to a pressure control valve that is accurately responsive to changes in pressure and is characterized by fast opening action of the valve thereby permitting a prompt response in a dependent portion of the circuit when a predetermined pressure is reached in the high pressure portion of the circuit.

The main object of the invention is the provision of an extremely efficient valve lending itself to use in a pneumatic circuit and which valve is adjustable to permit the exercise of close control over the functions of the circuit.

Another object of the invention is the provision of a pressure control valve that functions to bypass fluid pressure from one portion of a circuit to another portion when the pressure in said one portion attains a predetermined adjustable level.

Still another object of the invention is the provision of a dependable valve of simple construction whose function is not likely to be impaired by dirt or other foreign material in the fluid.

Yet another object of the invention is a control valve having an extremely fast action that permits the fluid pressure to be applied to a portion of the circuit when desired without an undesirable time delay.

Other objects and advantages will be apparent from the following specification and from the drawings.

FIG. 1 is a top plan view of a valve constructed in accordance with the present invention.

FIG. 2 is a vertical sectional view of the valve of FIG. 1.

FIG. 3 is a fragmentary sectional view in a plane at right angles to the plane of FIG. 2 showing the piston structure in the intermediate position at which the full fluid pressure is applied to the discharge port.

FIG. 4 is a fragmentary vertical sectional view similar to FIG. 3 but showing the valve in the fully open position.

In detail, the valve structure includes an upper body portion generally designated 1 and a lower spring well generally designated 2. The body 1 and spring well 2 are secured together in fluid tight relation by means of bolts 3 (FIG. 4).

The body 1 is preferably formed with an inlet bore 5 which is threaded at its opposite ends to receive therein a conduit such as the pipe fitting indicated at 6. The end of bore 5 opposite conduit 6 may be threaded to receive a pipe fitting of different diameter or it may be plugged with a plug 7. This structure permits the connection of the valve body to a source of pressure by means of conduits of different sizes and also permits connection to only one side of the valve body, if desired.

Communicating at its upper end with the inlet bore 5 is a central vertically extending bore 10 which connects at its lower end with a relatively large diameter bore 11. Slidably received in bores 10, 11 is a piston structure which includes a relatively small piston 12 and a relatively large piston 13. These pistons 12, 13 are integrally connected together for movement as a unit with piston 12 reciprocable in bore 10 and piston 13 reciprocable in bore 11.

Piston 12 is provided adjacent its upper end with a groove 14 in which is received an O-ring 15. Piston 13 is provided with a relatively wide groove 17 (FIG. 4) in which is received a U-cup seal 18. This U-cup seal 18 flares outwardly to provide an upper edge 19 in fluid tight sliding engagement with bore 11.

At the juncture between bores 10, 11 bore 10 is flared gradually downwardly and outwardly as indicated at 21 and is ground so as to provide a smooth transition for small piston 12 and its O-ring 15. At this point it may be noted that, although piston 12 is never completely out of the bore 10 and its flared portion 21, even in its open position (FIG. 4), the above noted smooth juncture permits the piston 12 to enter and leave the bore 10 in a controlled manner. When the valve is fully opened the relatively heavy bottom portion 23 of piston 13 seats on the upper end of spring well 2.

The above described piston structure is urged upwardly at all times by means of a vertically elongated compression spring 25 which engages large piston 13 at its upper end and an adjustable spring seat 26 at its lower end. Said spring and seat are received within a vertically extending bore 27 formed in spring well 2. The sidewall of spring well 2 is formed with vent 45.

Spring seat 26 is carried on a vertically extending stem generally designated 30 which is threaded at its upper end for threaded securement to valve seat 26 and which is rotatably received adjacent its lower end in a bore 31 formed in the base 32 of the spring well. Secured at the lower end of stem 30 by means of set screw 34 is an adjustment knob 35 which may be rotated to translate spring seat 26 thereby adjusting the compressive load on spring 25.

It is preferable to calibrate the compression in spring 25 in terms of rotations or fractions of a rotation of knob 35. To this end the upper side of knob 35 is provided with a plurality of (preferably four) indentations 36 which are adapted to receive therein the outer ball end of a spring urged forg 37. By this structure rotations of knob 35 may be equated to pounds loading on piston 13.

For the purpose of preventing rotation of spring seat 26 the same is provided on its periphery with an axially extending slot 39 which receives therein the inner end of a screw 40 threadedly received in the sidewall of spring well 2.

One or more discharge ports 41 may be formed in the valve body communicating with the large bore 11. Since it is necessary for the resilient U-cup seal to slide over the discharge port it is preferable that the actual connection with the bore 11 be in the form of a plurality of relatively small apertures. For example in FIGS. 3, 4 three apertures 42 are formed by drilling into the bore 11 from discharge port 41. If desired additional ports may be provided and connected together externally to the discharge line. By this structure any tendency of the resilient material of U-cup 18 to be extruded into the discharge port when pressure is applied to the upper side of the piston is minimized.

In operation the valve remains in its normal position of FIG. 2 as long as the fluid pressure in inlet 5 is insufficient, acting over the area of bore 10 to overcome the loading on the piston structure by spring 25. When the pressure in inlet 5 is increased to exceed the predetermined amount corresponding to the adjustable loading of spring 25, the piston structure is urged downwardly against the resistance of the spring into the fully open position of FIG. 4. However, when the intermediate position of FIG. 3 is reached at which the O-ring 15 is just leaving the bore 10 and is entering the flared portion 21, it will be noted that the trailing edge 19 of the U-cup seal 18 has already passed the discharge apertures 42. By this structure there is no tendency for the seal 18 to be extruded into the discharge apertures and the life of the valve is therefore prolonged. Upon the return stroke of the valve to closed position the upper side of the piston will of course be under a reduced pressure so that there is little tendency for the U-cup seal to interfere with the small apertures 42.

Since fluid is captured within bore 11 during the return stroke a small axially extending bleed hole 44 (FIG. 2) is formed in piston 13 to exhaust said bore. The rate of return of the piston structure to the closed position of FIG. 2 is of course slow compared to the high speed opening movement of the valve.

It will be noted that the above described simple valve construction does not rely on accurate registration of pistons and bores machined to close tolerances and therefore the functioning of the valve is relatively unaffected by dirt and other foreign material that may enter the valve body. At the same time construction of the valve is simple since flexible elements, that is O-ring 15 and U-cup seal 18, are employed to effect the desired sliding fits.

The valve is extremely fast in its action since, when it attains the position of FIG. 3 during opening movement, the full line pressure is imparted to piston 13 to forcefully urge it downwardly at a high rate of speed to the open position of FIG. 4. In this way the desired response of the portion of the circuit activated by the discharged fluid may be achieved substantially instantaneously after the predetermined pressure in the inlet is attained.

I claim:
1. A pressure control valve comprising:
 a body formed with an inlet and an outlet,
 a first relatively small diameter bore communicating at one end with said inlet,
 a second relatively large diameter bore communicating with the other end of said first bore and coaxial therewith,
 a piston structure including a first piston slidable in said first bore and a second piston fixedly secured to said first piston and slidable in said second bore,
 load applying means for applying a predetermined axially directed load on said piston structure for urging the latter to valve closing position with said first piston within said first bore and in sealing engagement therewith,
 said piston structure being movable in the reverse direction to open position with said first piston out of sealing engagement with said first bore when the pressure of fluid in said inlet exceeds a predetermined amount and overcomes said applied load,
 said outlet communicating with said second bore at a discharge port intermediate said small bore and said second piston when said piston structure is in said open position whereby the fluid from said inlet is received directly through said outlet,
 said first bore being flared to a progressively greater diameter toward its juncture with said second bore to permit fluid flow from said inlet axially past the periphery of said first piston when said piston structure is in said open position,
 and stop means holding said piston structure in said open position with a portion of said first piston within said first bore and said flared portion.

2. A valve according to claim 1 wherein said first piston remains in sealing engagement with said first bore during opening movement of said piston structure until said outlet is uncovered by said second piston.

3. A valve according to claim 2 wherein said second piston is provided with a flexible sealing element in engagement with the sidewalls of said second bore.

4. A valve according to claim 3 wherein said flexible sealing element is an annular member of an elastomer and formed to a U-shaped cross section having one side in engagement with said sidewalls of said second bore.

References Cited
UNITED STATES PATENTS

| | | | |
|---|---|---|---|
| 2,540,395 | 2/1951 | Ifield | 137—469 |
| 2,591,528 | 4/1952 | Filstrup | 137—469 |
| 2,720,219 | 10/1955 | Grove | 251—210 XR |
| 2,860,662 | 11/1958 | Gres | 137—469 |
| 2,904,616 | 9/1959 | Koepke | 137—469 XR |

HAROLD W. WEAKLEY, *Primary Examiner.*

U.S. Cl. X.R.

251—210